May 3, 1960   A. D. PAULL ET AL   2,935,231
COLLAPSIBLE TUBE AND INSERT THEREFOR
Filed Feb. 17, 1958   2 Sheets-Sheet 1

INVENTOR.
AMBROSE D. PAULL
HOWARD A. KELLY Sr.
ERNEST EUGENE CULP
BY Christy, Parmelee & Strickland
attorneys May 3, 1960 A. D. PAULL ET AL 2,935,231
COLLAPSIBLE TUBE AND INSERT THEREFOR
Filed Feb. 17, 1958 2 Sheets-Sheet 2

INVENTORS
AMBROSE D. PAULL
HOWARD A. KELLY, Sr.
ERNEST EUGENE CULP
BY Christy, Parmelee
Strickland attorneys

United States Patent Office 2,935,231
Patented May 3, 1960

2,935,231
COLLAPSIBLE TUBE AND INSERT THEREFOR

Ambrose D. Paull, Shawnee Hills, Howard A. Kelly, Sr., Triadelphia, and Ernest Eugene Culp, Wheeling, W. Va., assignors to Wheeling Stamping Company, Wheeling, W. Va., a corporation of West Virginia Application February 17, 1958, Serial No. 715,677

4 Claims. (Cl. 222—94)

This invention relates to collapsible tubes of the type commonly used for the dispensing of tooth paste and similar flowable paste-like materials, and relates more particularly to a tube and insert for a tube to be used where two different ingredients are used in the tube and one is mixed with the other during the extrusion of the contents from the tube, usually to produce a pleasing striped effect.

It has heretofore been proposed to provide in the neck of a collapsible tube a hard plastic insert which projects into the cavity of the tube from the neck, and which has open-ended grooves terminating in the neck end. One color tooth paste may be first put into the tube at the neck end, and then the tube filled with another color, as for example red may first be charged into the tube and then white. Sometimes a washer slidable on the insert is used between the red and the white, forming a movable partition. When the tube is squeezed in the usual manner, the white passes out through the central opening in the insert while a smaller proportion of red is simultaneously extruded along the grooves on the outside of the insert to mix with the stream of white that is flowing through the middle and produce a candy stripe effect. The washer acts as a movable piston, as well as a separating diaphragm between the contrasting substances, to aid in expelling the red or first color, but its use is not essential.

Tubes of this type have been extremely expensive to assemble because the insert which is provided to give the mixing or striping effect must be put into the tube from the base, and after the tube has been otherwise completed. This is a slow and expensive operation.

The present invention has for its principal object to overcome this difficulty by providing an insert of improved construction which can be inserted into the tube from the neck end instead of the base end, and which will be retained in the neck of the tube. The insert so provided also aids in forming a seal between the cap at the end of the tube and the tube, and prevents the contents of the tube from flowing over the metal lip of the neck.

Our invention may be more fully understood by reference to the accompanying drawings in which.

Figure 1:
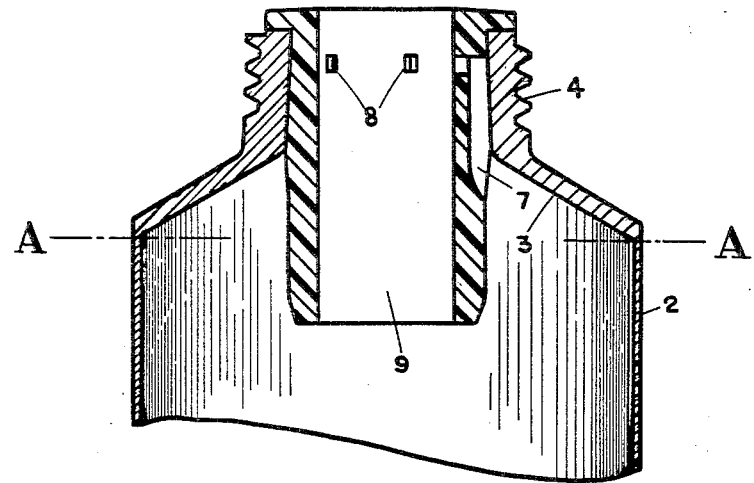
Fig. 1 represents a longitudinal section through the neck end of a collapsible tube having an inserted therein according to the present invention.
Figures 2, 3:
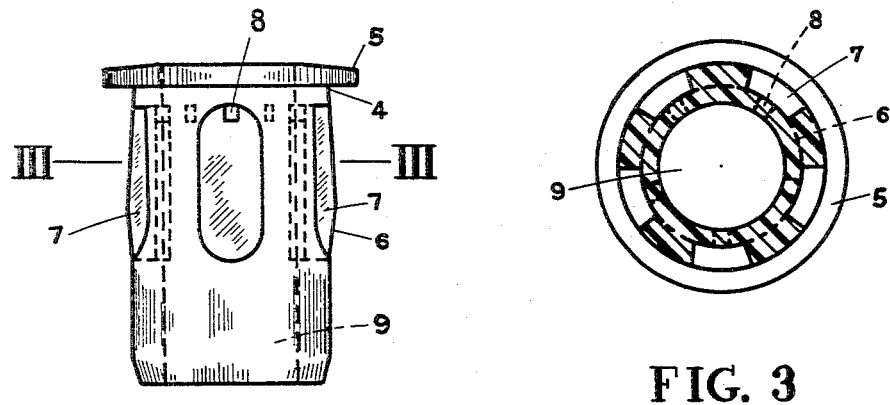
Fig. 2 is a side elevation of the insert itself.
Fig. 3 is a transverse section in the plane of line III—III of Fig. 2.

Referring first to Figs. 1 to 3 of the drawings, 2 designates the neck end portion of a conventional collapsible tube which is usually formed of deformable metal, such as lead, tin, aluminum, or combinations of these metals. The tube has a conventional rigid shoulder 3 and a threaded neck 4 through which the contents of the tube are discharged. According to the present invention there is provided a sleeve of polyethylene material or a similar resilient compressible plastic material which is designated generally as 4, and which has a flange 5 at its outer end that extends over the end of the metal neck of the tube. It has a sleeve portion 6 formed integral with the flange, and which is of a length to protrude through the neck of the tube and extend into the cavity of the tube when the insert is applied to a tube with the flange 5 flush against the outer face of the tube neck. In the exterior of this sleeve are one or more (preferably a plurality) of longitudinally-extending grooves 7 which are of a length such that when the insert is in the neck of the tube the inner ends of these grooves open into the cavity of the tube just inside the shoulder 3, while the outer ends of these grooves terminate inwardly from, but relatively close to, or adjacent the flange 5. At the outer end of each groove in the bottom wall thereof is a tiny radial port 8 which opens into the central passage 9 through the insert. The area of the port is less than the cross-sectional area of the channel or passage provided by the groove. This restricts the amount of material which will flow through the port without unduly restricting the free flow of material to the port. The extreme inner end of the insert has the exterior slightly beveled and the diameter of the sleeve 6 is of smaller diameter than the portion which is engaged in the neck so as to facilitate the entering of the fitment into the tube, the portion of the fitment that is in the neck being of a diameter about equal to the inside diameter of the neck of the tube, this diameter being such that when the insert is forced into the neck end of the tube the polyethylene or other resilient plastic material will be slightly compressed and thus exert sufficient frictional pressure against the inside of the metal tube neck to hold the insert against removal under all normal conditions of use.

This insert is of a character which can be molded in an injection molding operation and hence can be produced at a commercially reasonable price. Since the insert can be forced axially into the neck of the tube from the outer end of the tube, its application to the tube can be more easily accomplished mechanically than inserts of the type heretofore developed which have to be inserted in the opposite direction by working through the open base end of the tube, and which, because of this and their rigid character, are insecurely retained in the tube neck. The resilience of the insert creates sufficient friction so that when the tube is squeezed to expel the contents, the insert is not forced out of the end of the tube. The flange 5 serves to position the insert so that it cannot be pushed inwardly through the neck of the tube, and it also extends over the metal end of the tube so as to form a gasket or seal when the cap, which is a conventional threaded cap (not shown), is screwed onto the tube. The polyethylene lip also keeps the tooth paste out of contact with the metal end of the tube and from the threads which sometimes tend to cause discoloration of the tooth paste at the neck of the tube.

When these tubes are used with the insert they may be first filled with one composition to approximately the level of the dotted line A—A in Fig. 1, the tube of course being in an inverted vertical position at the time of filling. The tube is then filled with the main body of contrasting material, and the contrast may be either of color or composition, or both. If a slidable washer is used on the inner end of the insert to separate the two compositions, it can be easily dropped into the tube after the first material has been charged into it.

As above indicated, a typical example may be the use of a red colored tooth paste in the neck end of the tube, and the use of white tooth paste filling the balance of the tube. When the tube is squeezed to extrude the contents, some of the pressure is effective to force the material in the neck and along the groove 7 and out the ports 8 where it will flow onto the main stream of material passing through the neck of the tube, producing a pleasing striped design. Usually the invention is used to form contrasting colored stripes on the extruded tooth paste, but the invention can be used in other instances where contrasting materials are to be discharged from the tube at the same time in proportioned amounts.

Figure 4:
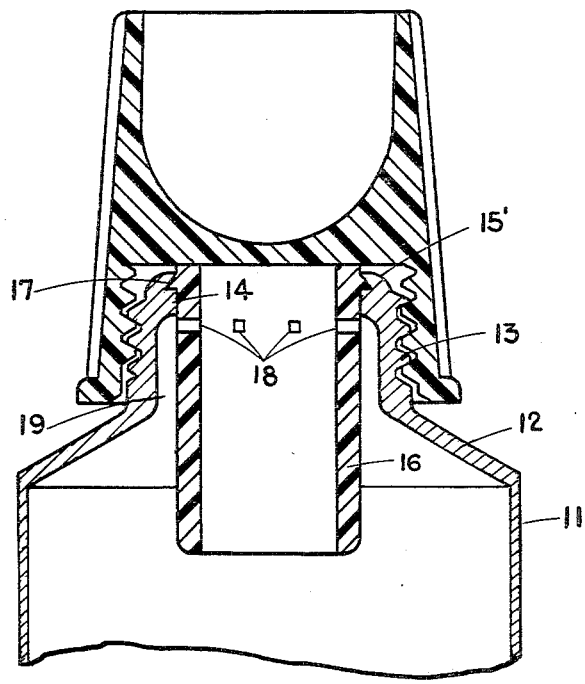
Fig. 4 is a view similar to Fig. 1 of a modified construction.
Figure 5:
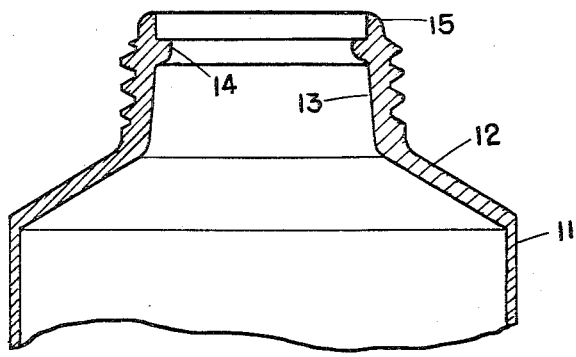
Fig. 5 is a longitudinal section through a tube designed to receive the insert shown in Fig. 4.
Figure 6:
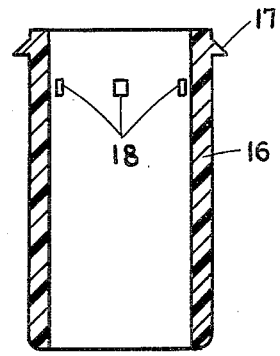
Fig. 6 is a longitudinal section through the insert itself.

The form of the invention shown in Figs. 4, 5 and 6 has an insert of more simple form positively locked in the tube against displacement, but requires some modification of the tube itself. In these figures, the tube designated generally as 11 has a shoulder 12 and a neck 13 which is threaded on its exterior, and which has an internal annular shoulder 14. Above this shoulder and beyond the threaded area of the neck there is an annular lip 15 which initially has the form shown in Fig. 5.

The insert 16 is of generally tubular form of uniform diameter slightly smaller than the internal diameter of the discharge passage in the tube neck. Near its outer end, the insert has an external bead 17, preferably of triangular shape as shown in Fig. 6. This bead is of such diameter as to contact the annular shoulder 14 when the insert is pushed into the neck of the tube. The lip 15 is then turned in or pressed over the bead as shown at 15' in Fig. 4. Since the bead is near but preferably not at the end of the insert, the insert in the finished tube projects beyond the metal of the tube neck so that the cap C seals against the end of the insert when it is screwed onto the tube. At a level just below or inside the plane of the shoulder 14 the insert has an annular series of small square or rectangular openings 18 therethrough.

The coloring material is first put into the tube in the manner above described to surround the insert 16 and then the main mass of material is injected to fill the tube. The coloring material which surrounds the insert is forced by pressure on the tube through the openings as previously described, but since the insert is of smaller diameter than the passage in the tube neck and is firmly centered in the tube, a channel is formed by the space 19 between the insert and the tube neck to the ports 18 through which coloring material can flow to the ports 18. Flutes or grooves on the exterior of the insert are therefore not required in this form and the insert is cheaper and easier to mold. The turning over of the lip 15 after insertion of the insert is readily accomplished, a machine of the general type disclosed in application Serial No. 588,120 filed by Walter T. Davis on May 26, 1956 being adapted for this purpose.

In either of the forms herein described the insert is inserted through the neck of the tube while an annular flange or bead seats against an annular abutment formed by the tube neck to prevent it from being pushed too far into the tube, while the end of the insert is engaged by the tube cap to form a seal, and with each a channel is provided for conducting the coloring or stripping ingredient from the neck end of the tube to annular ports opening radially through the insert inwardly of the said flange.

We claim:

1. A collapsible dispensing tube comprising a tube body with a shoulder and exteriorly threaded discharge neck at one end thereof, the discharge neck having a discharge passage therethrough, a resilient plastic sleeve inserted in the neck and insertable axially into the neck only from the exterior of the neck end of the tube and extending into the interior of the tube, the sleeve having an annular flange adjacent its outer end of larger diameter than the opening in the neck through which the sleeve passes, the tube having means providing an annular abutment on which the flange on the sleeve seats and which limits the sleeve from pushing through the tube neck, the outer end of the sleeve protruding beyond the end of the tube for contact with the interior of a cap which is screwed onto the neck of the tube, to form a seal with such cap the sleeve having radial openings therethrough adjacent the flange but inwardly from the abutment forming means, and a channel between the sleeve and the interior of the tube neck through which contents of the tube may flow to the radial openings into the interior of the sleeve.

2. A collapsible tube as defined in claim 1 in which the neck of the tube has an annular lip outwardly of the abutment which is turned in over the flange on the sleeve to immovably secure the sleeve on the tube.

3. A collapsible tube having a discharge neck with an axial opening therethrough, an annular shoulder on the interior of the neck, a lip extending outwardly from the neck beyond the shoulder, a plastic sleeve inserted in the opening in the neck, the sleeve being of smaller diameter than the opening and being insertable axially into the neck of the tube from the exterior of the neck end only and having an annular flange thereabout near its outer end which is seated on the annular shoulder, the lip being turned in over the flange to retain the sleeve in the tube neck, the sleeve having a series of radial ports therethrough located near the outer end of the sleeve but inwardly of the shoulder in the tube neck.

4. A collapsible tube neck insert comprising a resiliently compressible plastic sleeve with an axial opening therethrough having an inner end portion of reduced diameter to facilitate the entering of the sleeve axially into the neck of a collapsible tube from the exterior of the neck end thereof and having a radial flange at its opposite end, the portion inwardly of the flange being of a diameter such as to have a force fit into the neck of the tube for which it is to be used, the sleeve having longitudinal grooves in its exterior extending from a point adjacent the flange to a point where their innner ends will open into the interior of the collapsible tube in which the sleeve is used, the sleeve having a radial opening at the forward end of the each groove into the passageway through the sleeve, the flange being wide enough to cover the outer end of the tube neck and form a seal with a cap which is screwed onto the neck of the tube.

References Cited in the file of this patent

UNITED STATES PATENTS

| | | |
|---|---|---|
| 1,535,529 | Hopkins | Apr. 28, 1925 |
| 1,745,382 | Rogers | Feb. 4, 1930 |
| 2,751,119 | Manning | June 19, 1956 |
| 2,789,731 | Marraffino | Apr. 23, 1957 |